United States Patent [19]

Ross et al.

[11] Patent Number: 5,082,103
[45] Date of Patent: * Jan. 21, 1992

[54] COMPUTER CONTROLLED LIGHT CONTACT FEEDER EMPLOYING FOUR INDEPENDENTLY DRIVEN CONVEYORS

[75] Inventors: Jeffrey L. Ross, Pulaski; James W. Krueger, Green Bay, both of Wis.

[73] Assignee: FMC Corporation, Chicago, Ill.

[*] Notice: The portion of the term of this patent subsequent to Aug. 1, 2006 has been disclaimed.

[21] Appl. No.: 123,620

[22] Filed: Nov. 20, 1987

[51] Int. Cl.5 .............................................. B65G 47/26
[52] U.S. Cl. .................................... 198/460; 198/572
[58] Field of Search .............. 198/425, 460, 572, 575, 198/577, 419.2; 364/468, 478

[56] References Cited

U.S. PATENT DOCUMENTS

| | | | |
|---|---|---|---|
| 3,155,221 | 11/1964 | Griner | 198/425 |
| 4,197,935 | 4/1980 | Aterianus et al. | 198/460 |
| 4,604,704 | 8/1986 | Eaves et al. | 198/460 |
| 4,852,717 | 8/1989 | Ross et al. | 198/462 |
| 4,921,092 | 5/1990 | Crawford et al. | 198/460 |

FOREIGN PATENT DOCUMENTS 2182299  5/1987  United Kingdom ............... 198/460

*Primary Examiner*—Joseph S. Valenza
*Attorney, Agent, or Firm*—Douglas W. Rudy; Richard B. Megley

[57] ABSTRACT

A light contact feeder for receiving randomly spaced articles, lightly abutting the articles and delivering single articles or paired articles to individual flights of a flighted conveyor. A first feeder conveyor lightly abuts articles from a supply conveyor and delivers the abutted articles to a second feeder conveyor which times the articles relative to the flights of the flighted conveyor. A third feeder conveyor matches article speed to flighted conveyor speed and a fourth feeder conveyor phases individual articles for placement between the flights of the flighted conveyor. The fourth conveyor can also group articles in pairs and phase the pairs for placement between the flights of the flighted conveyor.

15 Claims, 17 Drawing Sheets

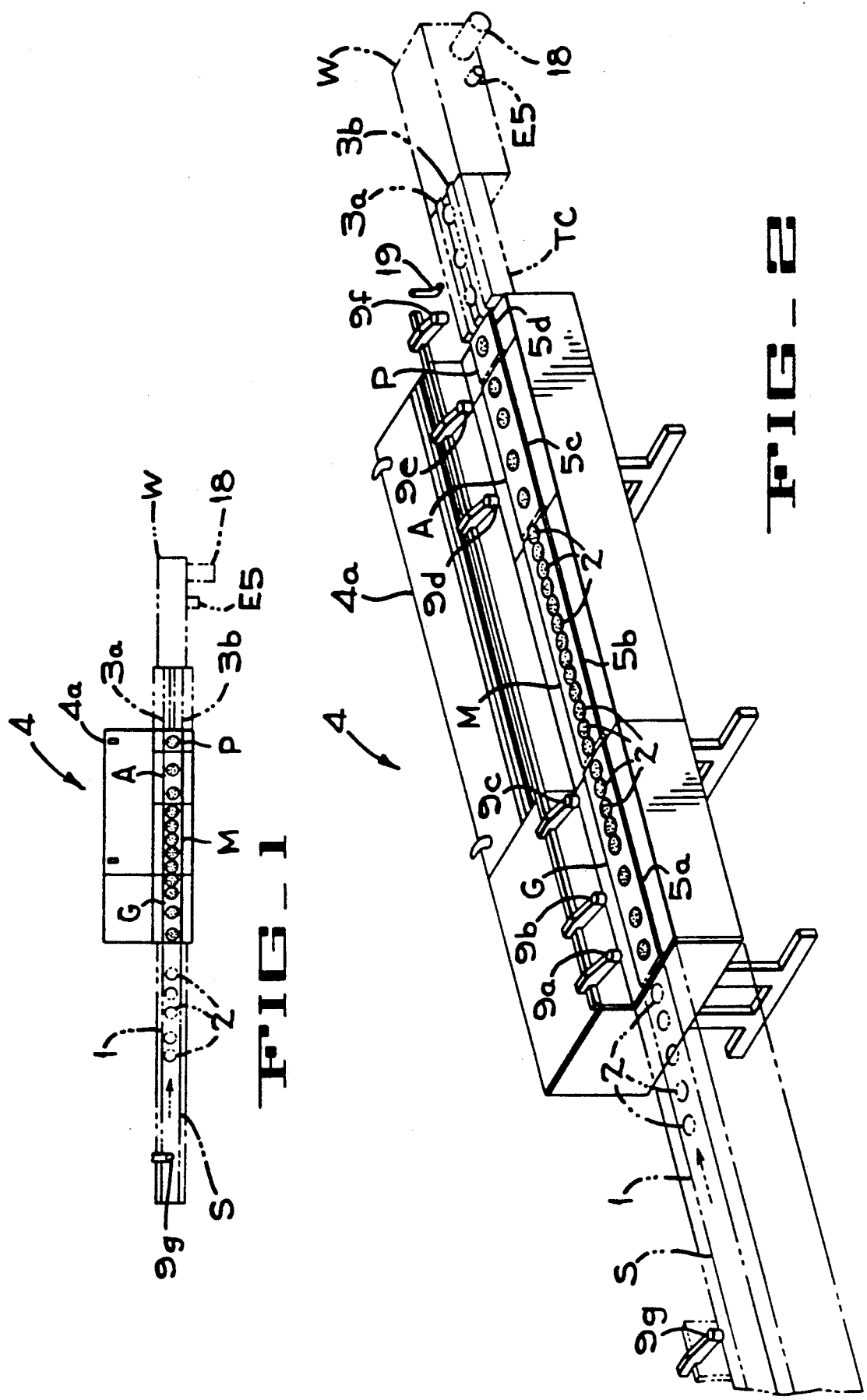

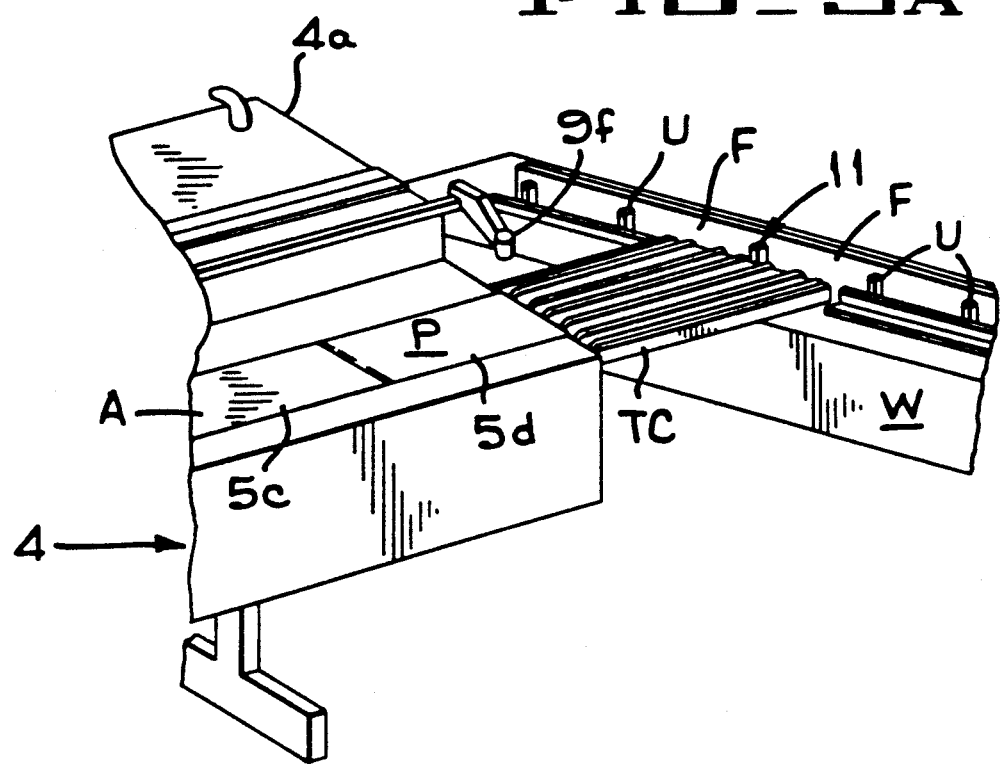
FIG_3A
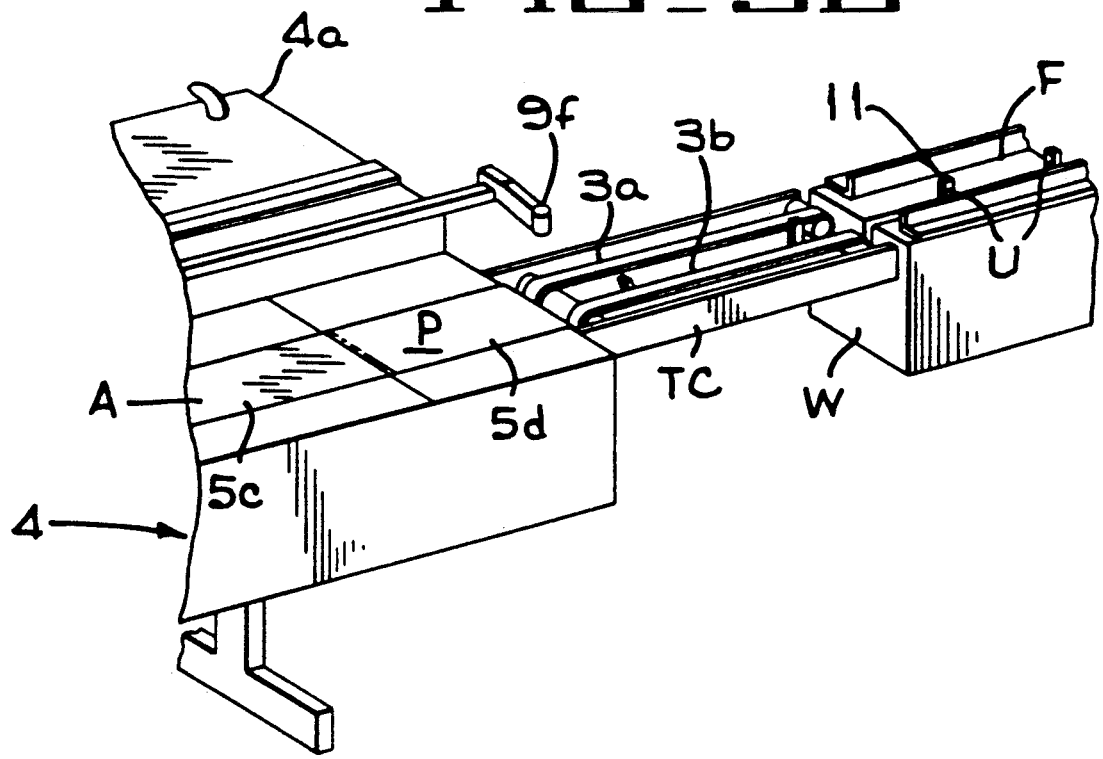
FIG_3B

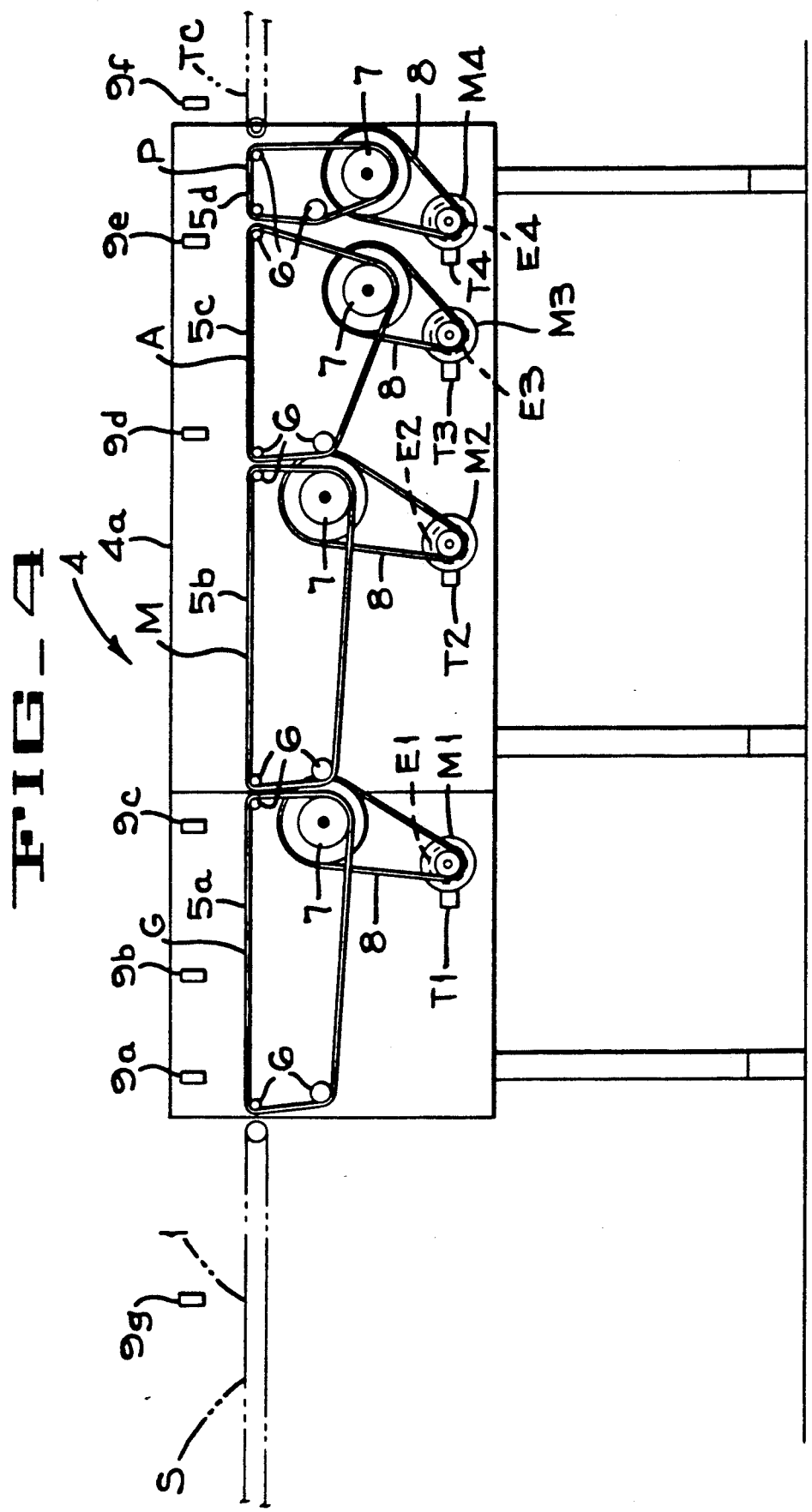
FIG_4

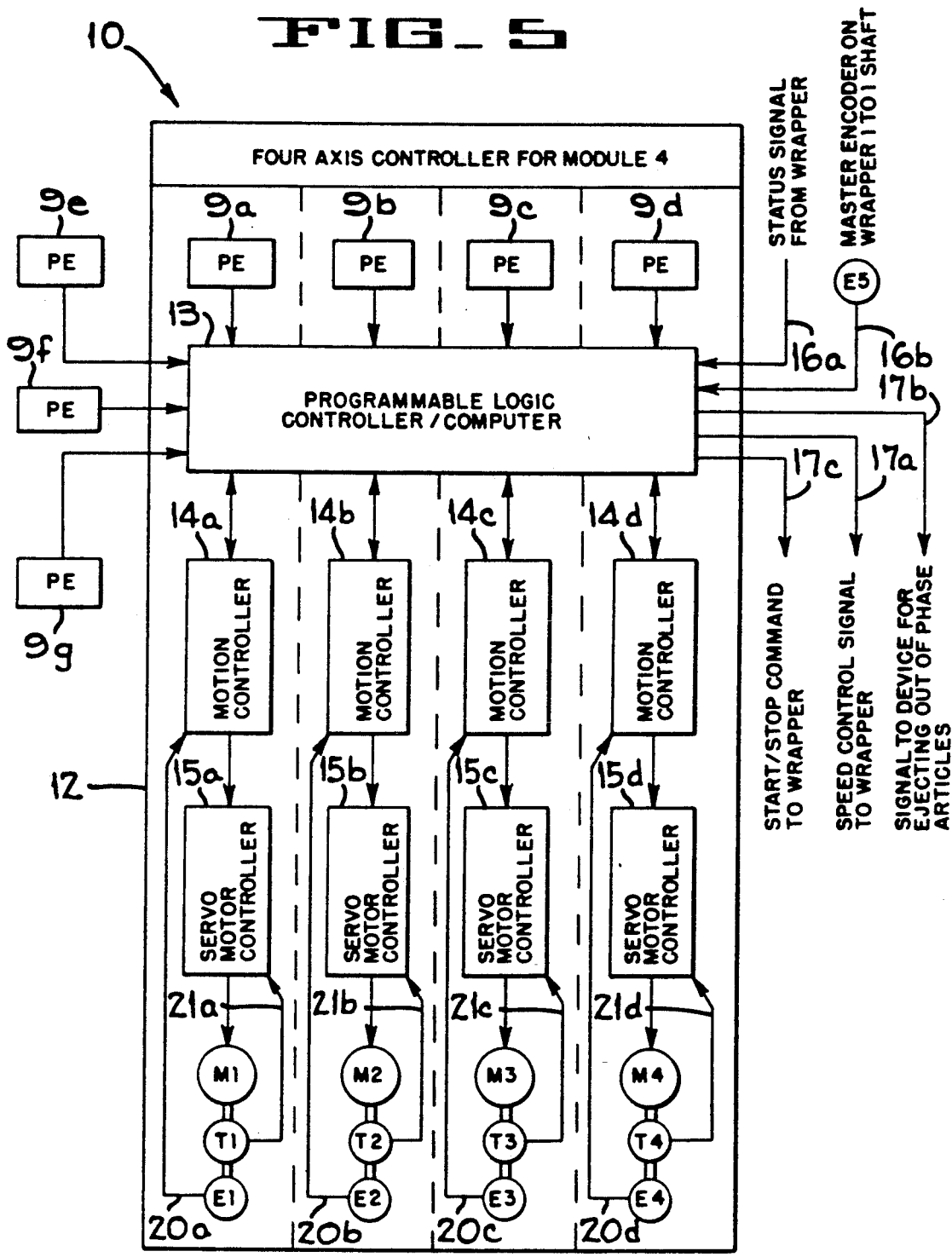

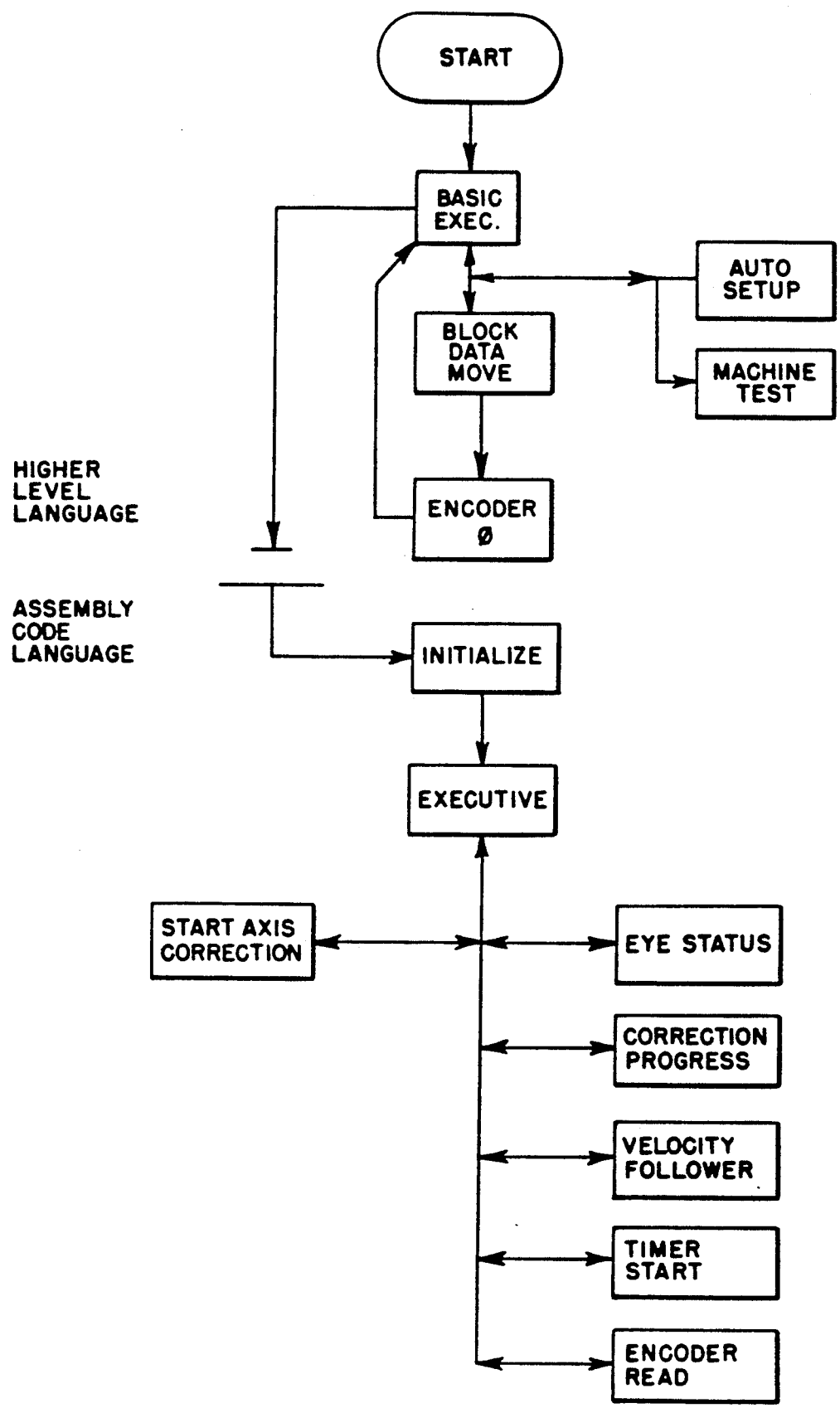

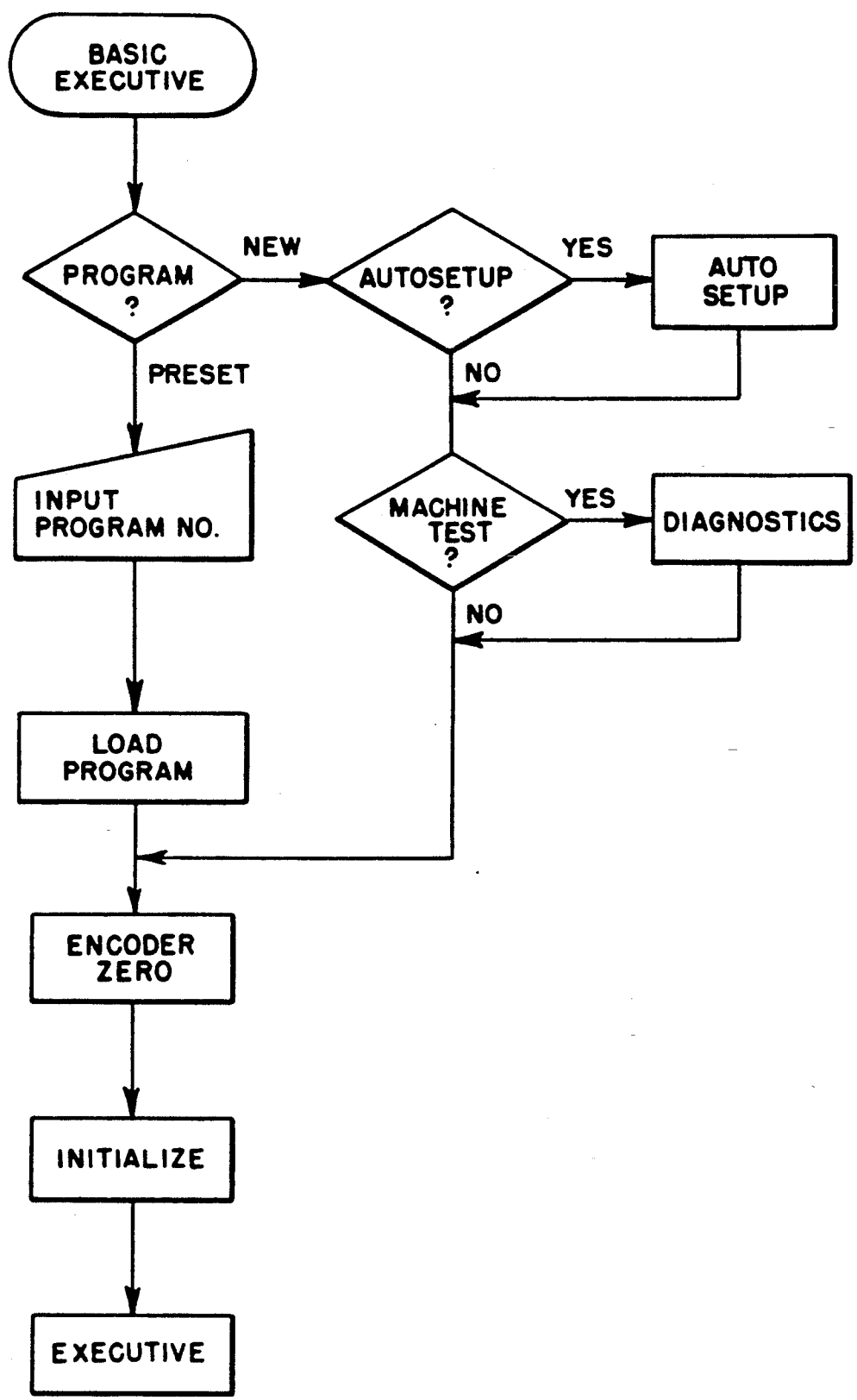
FIG_7

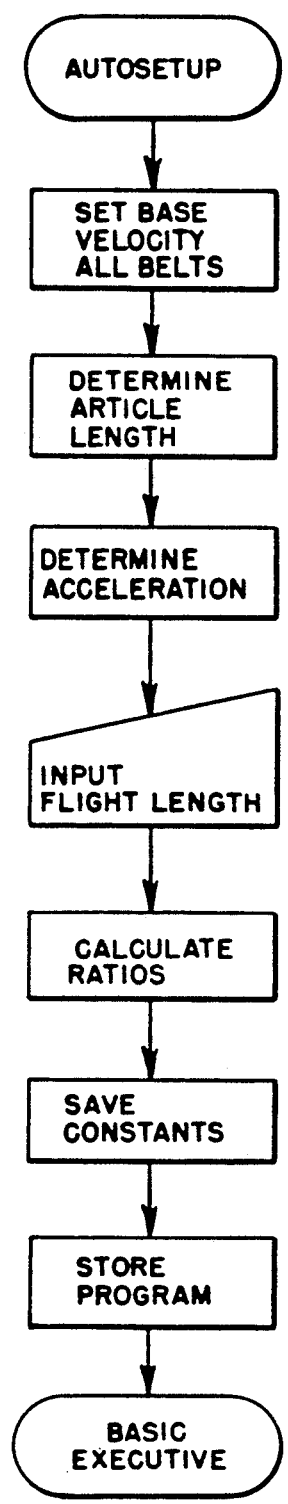
FIG_8
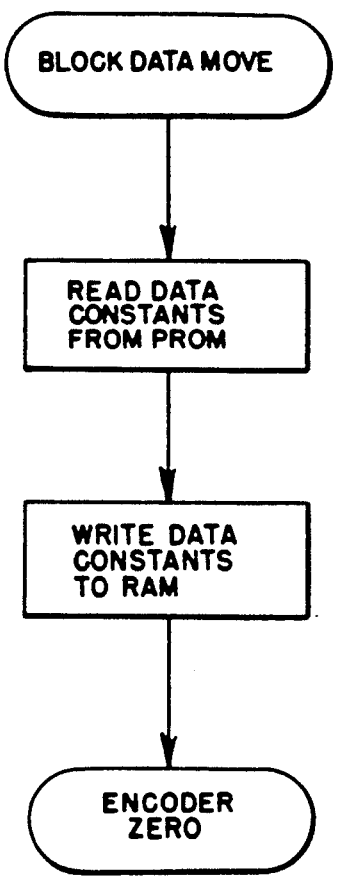
FIG_9

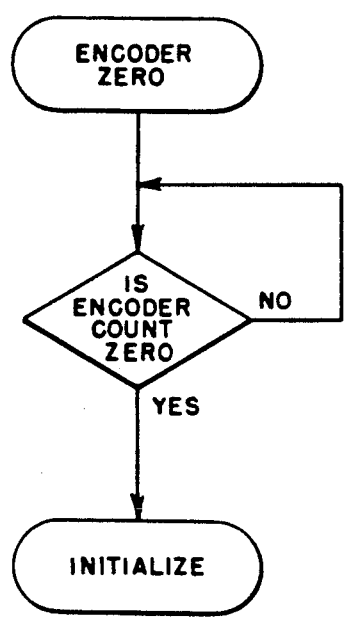
FIG_10
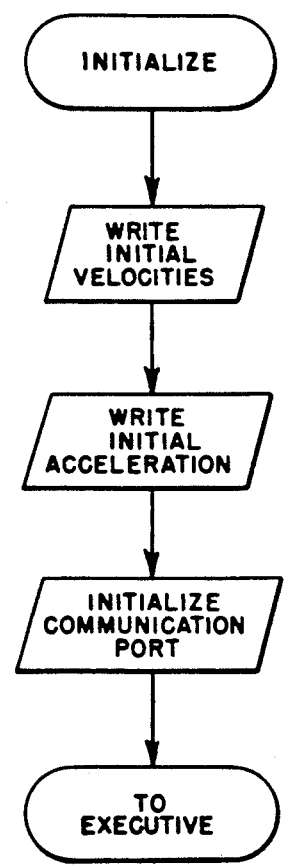
FIG_11

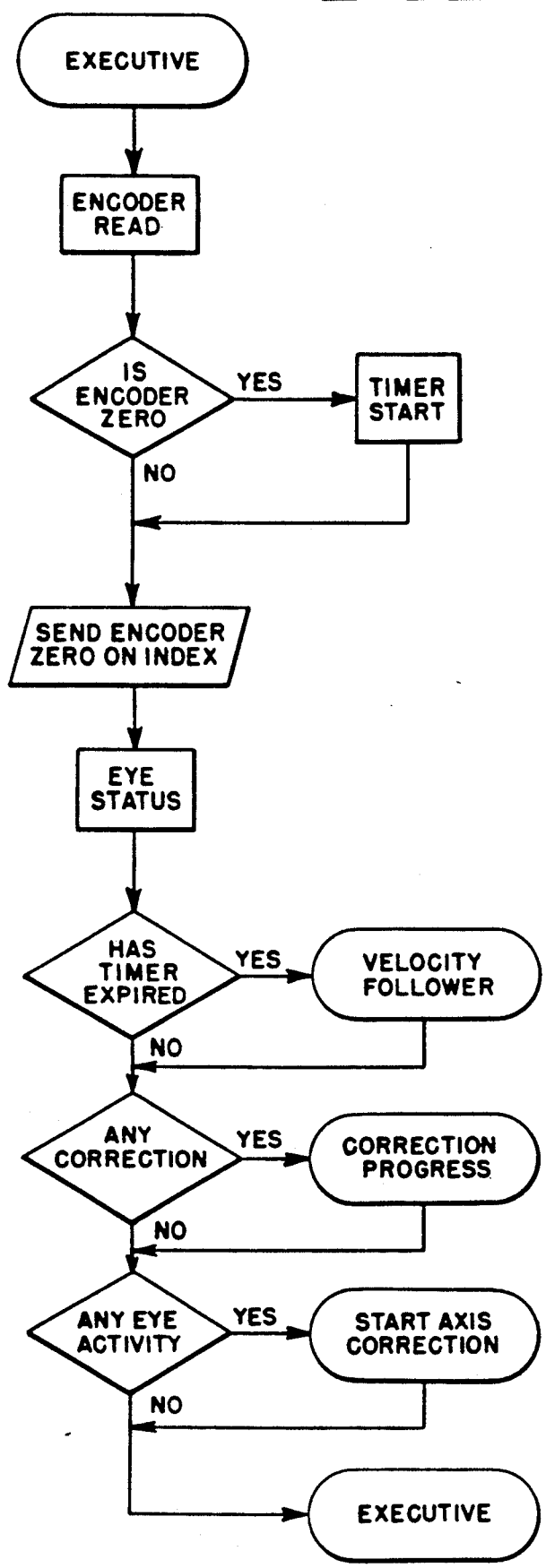
FIG_12

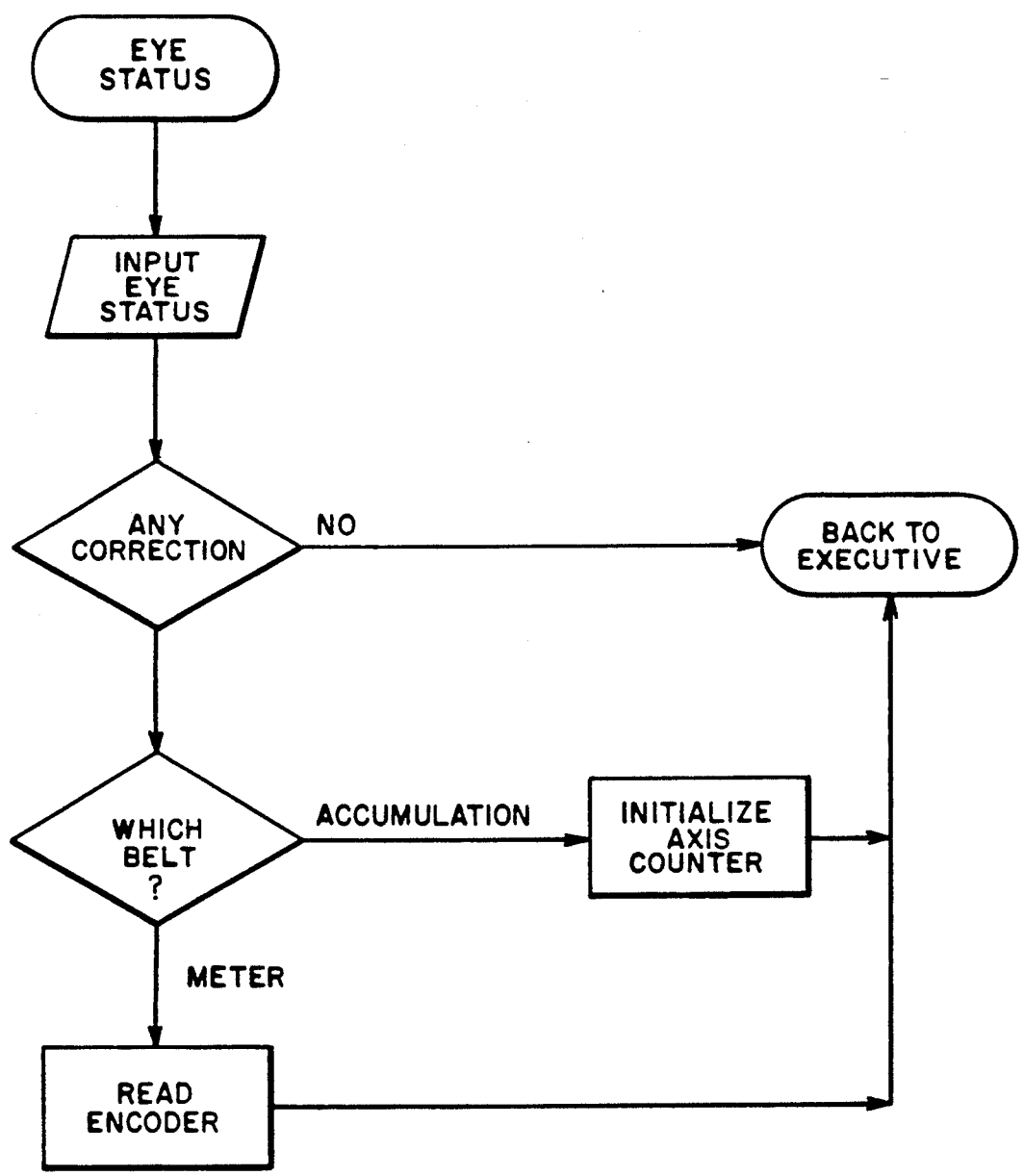
FIG_13

FIG_14
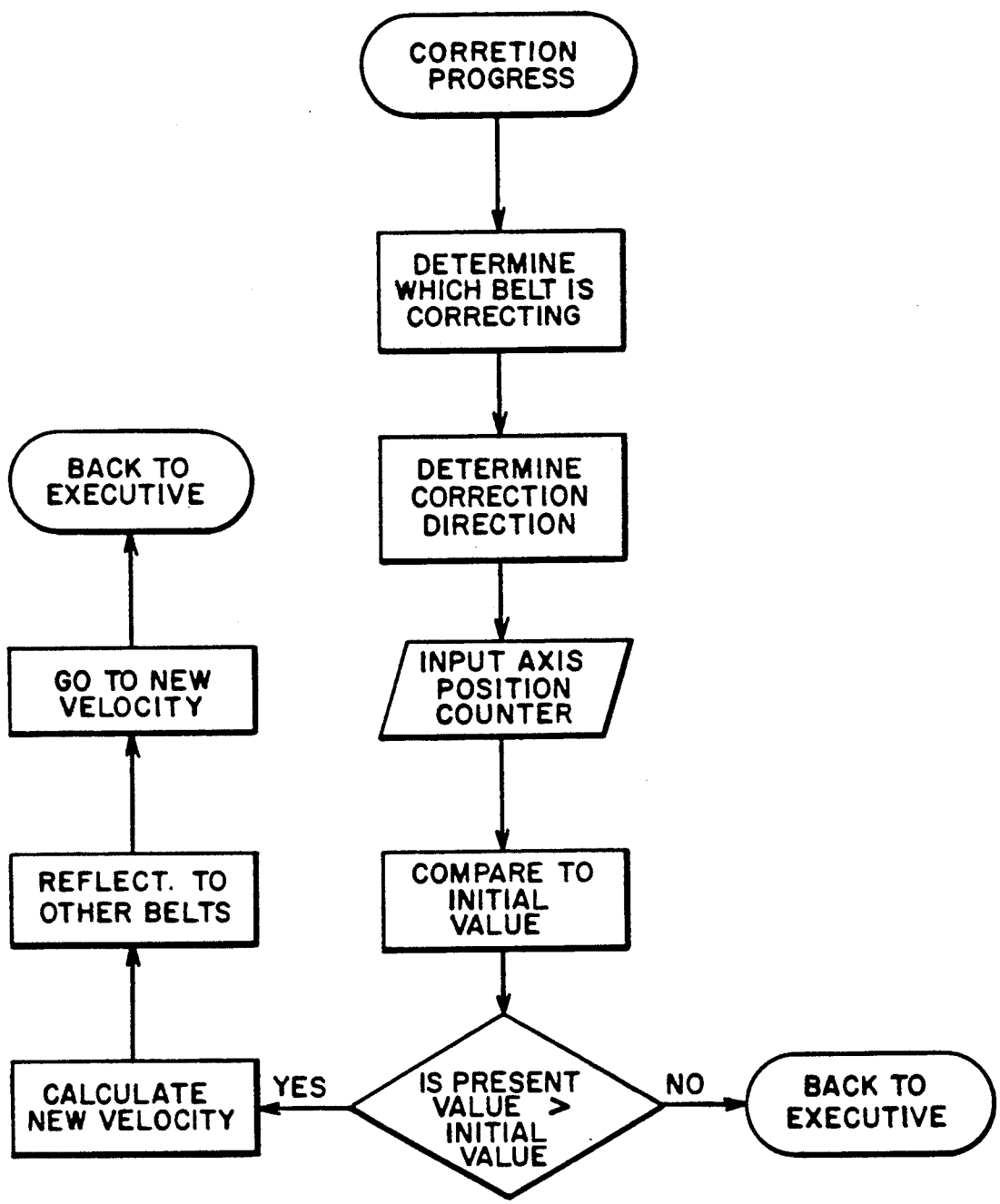

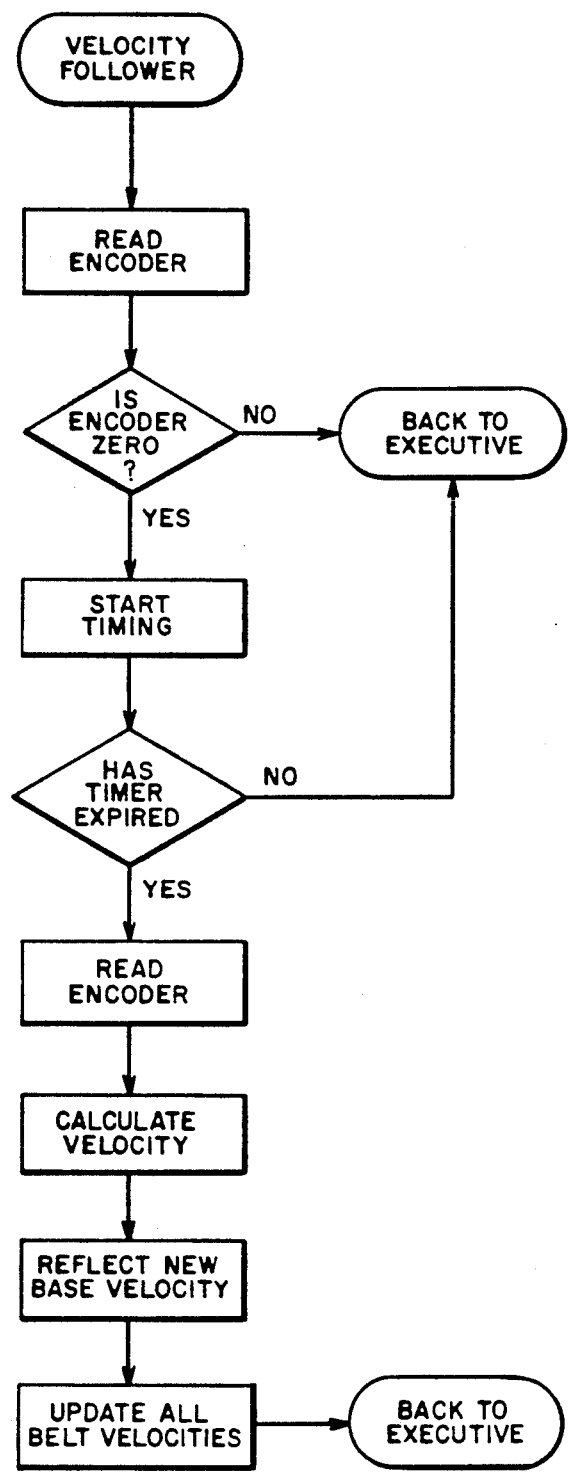
FIG_15
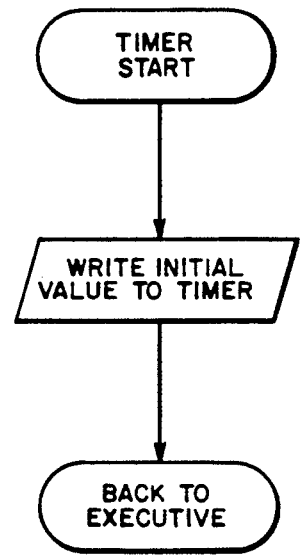
FIG_16

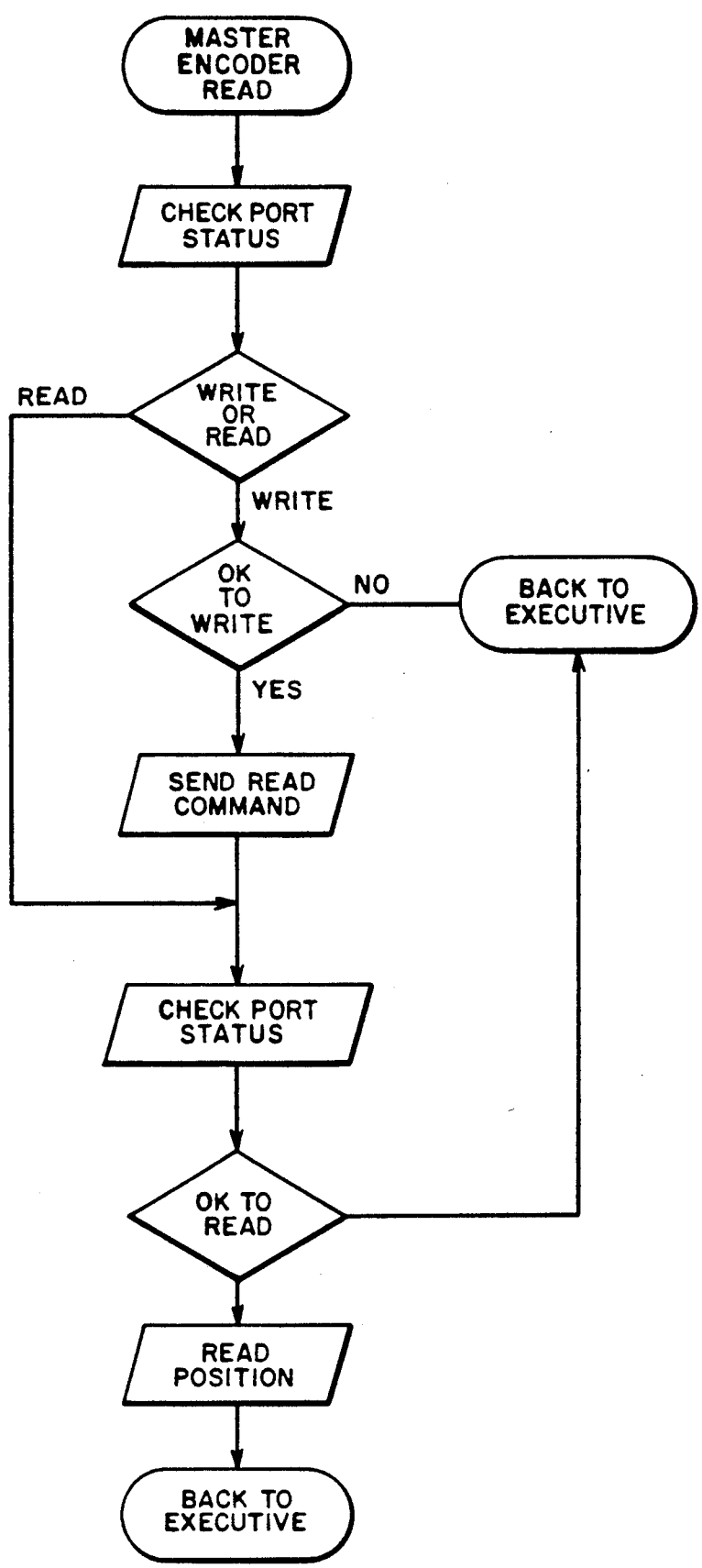
FIG_17

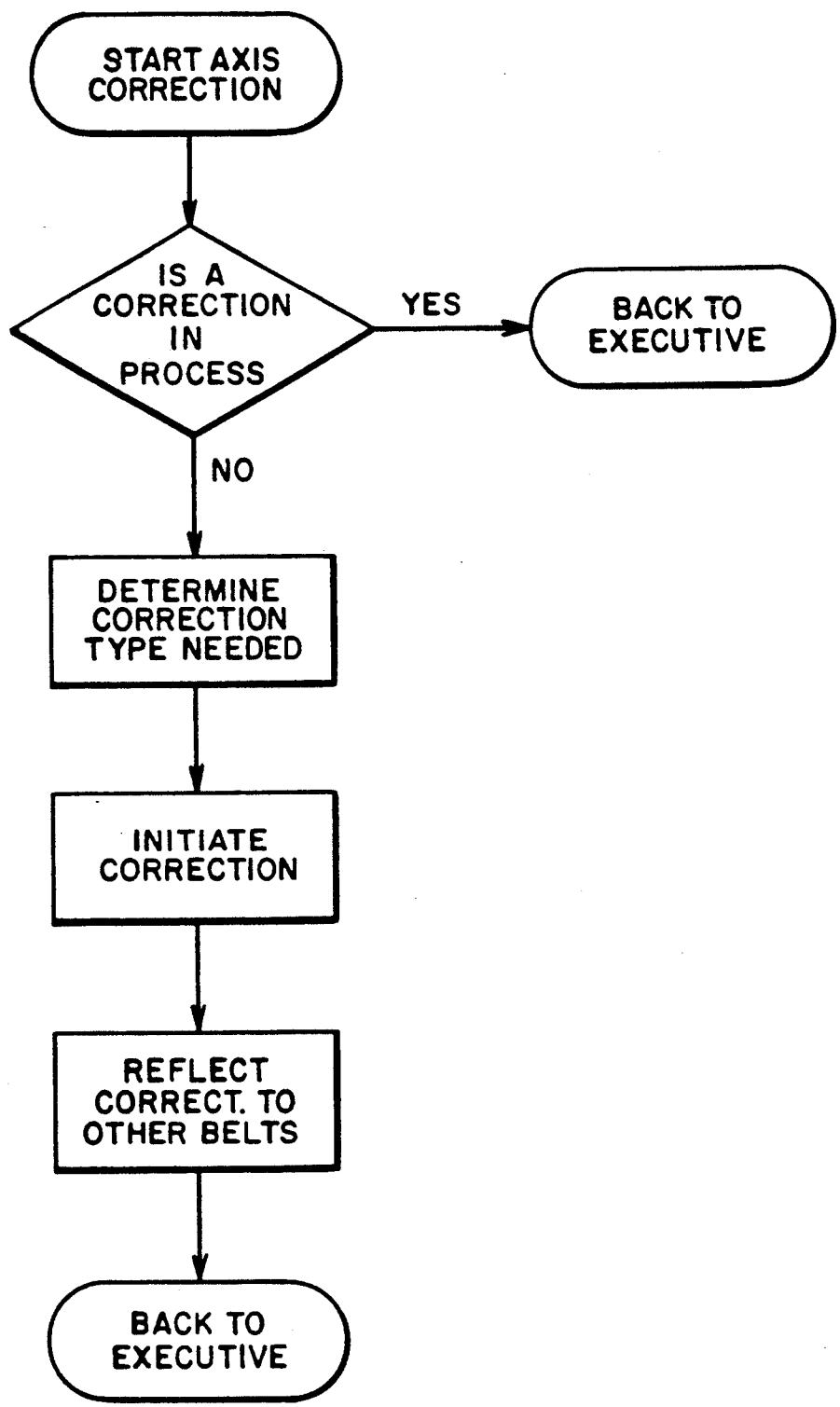
FIG_18

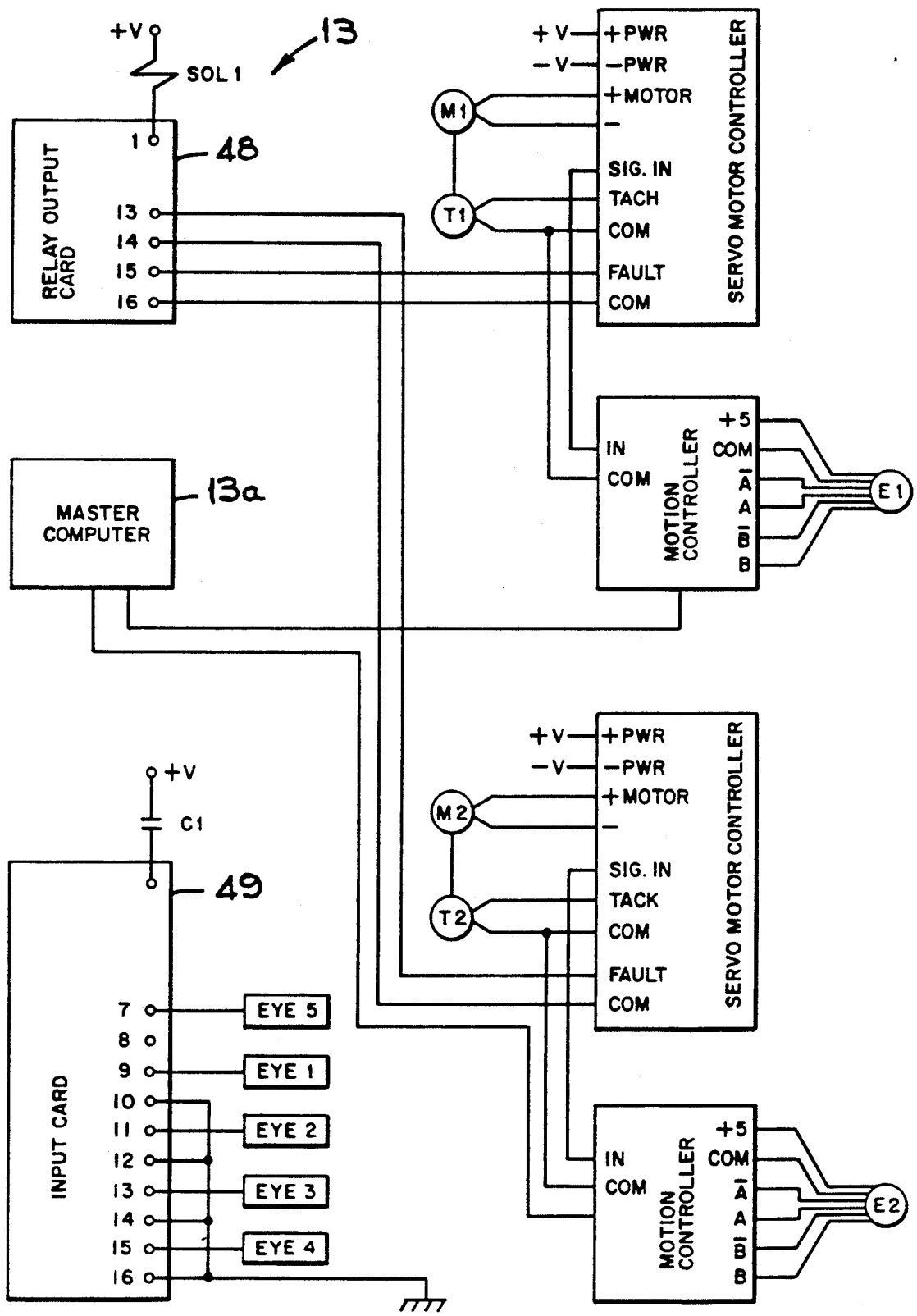

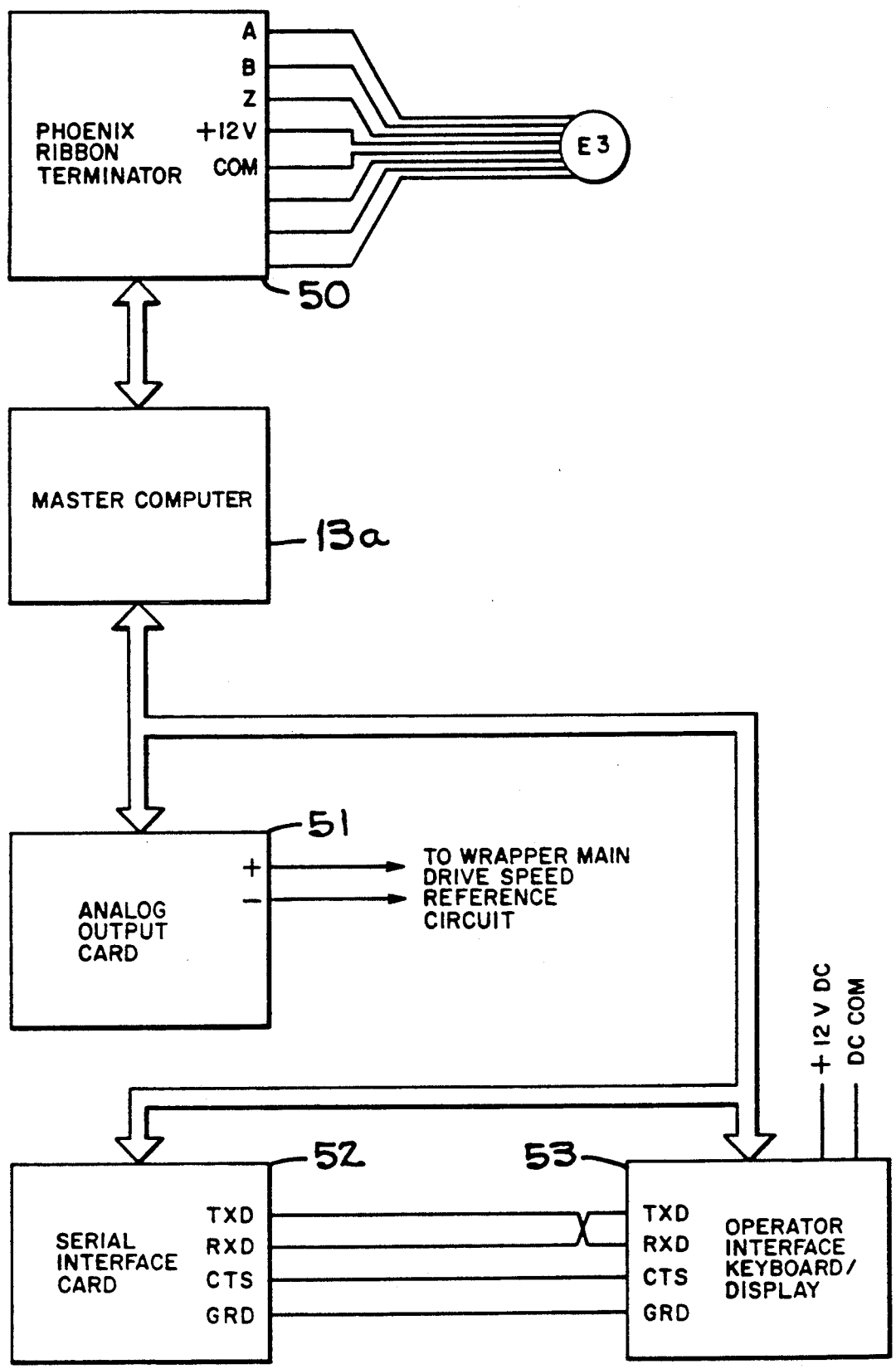
FIG_20

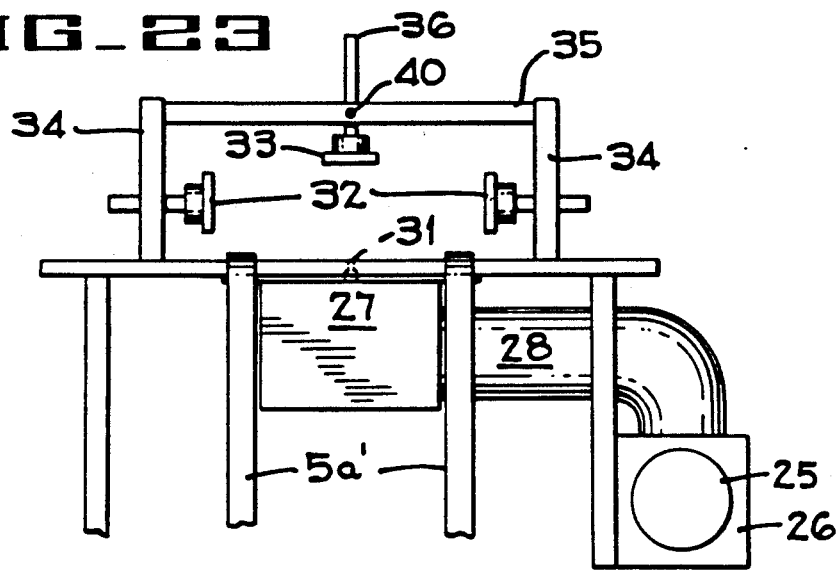
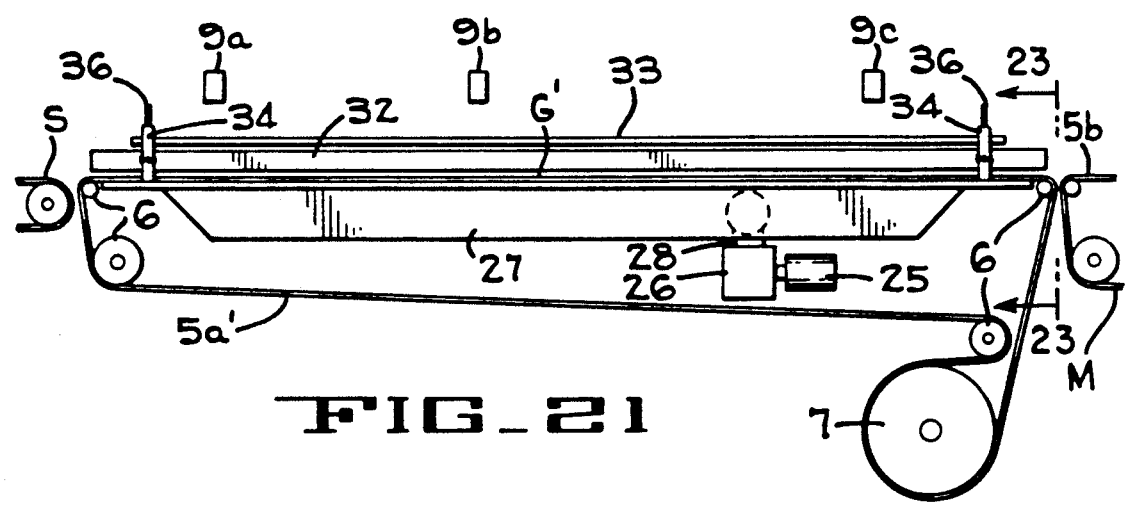
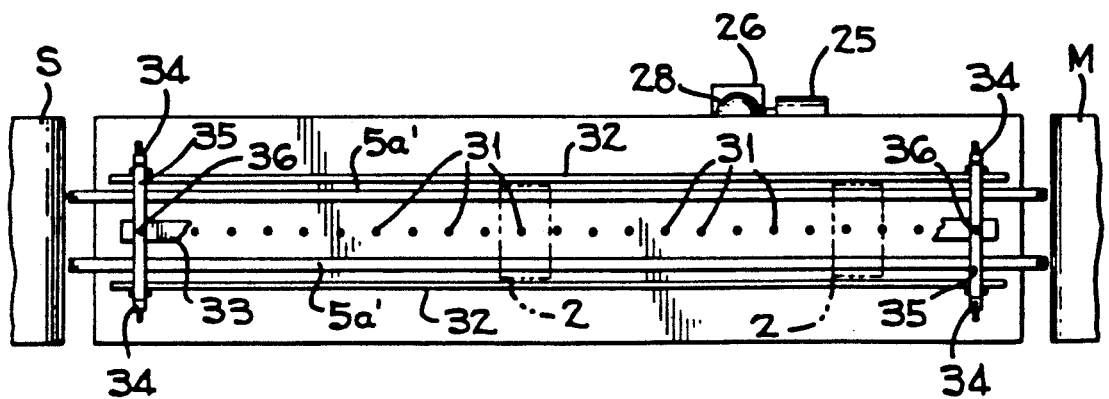

COMPUTER CONTROLLED LIGHT CONTACT FEEDER EMPLOYING FOUR INDEPENDENTLY DRIVEN CONVEYORS

BACKGROUND OF THE INVENTION

The present invention relates to apparatus for automatically feeding articles into an article processing machine, and more particularly, to apparatus for continuously correcting the positions of randomly spaced articles and transferring the articles with proper timing into the receiving conveyor of a horizontal wrapping machine.

Horizontal wrapping machines commonly use conveyors to feed a series of longitudinally spaced articles to a wrapping portion where one or more of the articles are placed into each wrapped package. Such wrapping machines conventionally are used with a feeder which receives articles from a supply conveyor and separates these articles into a predetermined spaced and timed relating to the wrapping machine receiver conveyor. The feeder usually includes an article accumulation conveyor which operates at a high speed so that a back log of articles from the supply conveyor are accumulated at the feeding station. Such a feeder may not work satisfactorily with delicate articles which may be damaged due to excessive pressure between the abutted articles.

A computer controlled light contact feeder employing a pair of servo driven flat belt conveyors has been disclosed in U.S. patent application Ser. No. 06/929,457 by the inventors of the present invention. This prior art two belt feeder takes randomly spaced articles and places them in lightly abutted contact before spacing and timing them for transfer into a receiving conveyor of a wrapping machine. This two belt feeder is relatively low in cost and can feed individual articles provided they have relatively uniform friction characteristics at rates ranging up to 300 articles per minute. This rate is reduced if the articles have a highly variable friction characteristic. This two belt feeder is also capable of grouping articles into pairs by intermittant metering. This pairing feature is achieved only at lower feeding rates because of acceleration limitations associated with intermittant metering.

There are many applications where it is desirable to employ a flat belt type of light contact feeder for accurate feeding of single articles and/or paired articles at higher rates than can be achieved with the previously disclosed low cost light contact feeder employing two flat belts.

SUMMARY OF THE INVENTION

The present invention provides a high performance light contact feeder which takes randomly spaced articles and places these articles in lightly abutting contact before spacing and timing them for transfer to a receiving conveyor of a wrapping machine. The present invention includes four flat belt conveyors which are individually driven by servo motors. These motors are automatically controlled to first close gaps between articles and thereafter to provide spaced articles timed relative to the receiving conveyor of a wrapping machine. The speed of each individual article can be periodically regulated to lightly abut the adjacent articles, and the speed of individual articles can be periodically adjusted to properly space and time the articles relative to the receiving conveyor of the wrapping or other article processing machine.

Since the articles are lightly abutted, even delicate articles, or articles which have irregular shapes can be fed in proper phase to the wrapper by the present invention. The control system can be adapted to feed articles of different lengths. The control system can monitor the rate of incoming articles and control the feeder and wrapping machine speed to maintain a backlog of lightly abutted articles within preset limits, and can start and stop automatically in response to the starting and stopping of article supply. Articles which may be randomly supplied in spaced relationship with one another can also be uniformly spaced and subsequently grouped into pairs at relatively high rates by the feeder of the present invention.

The first two flat belt conveyors of the present invention function in the same manner as the two flat belt conveyors of the invention disclosed in the U.S. patent application Ser. No. 06/929,457 by the present inventors. The teachings of the prior art are incorporated herein as a base to be improved by incorporating an additional two servo driven flat belt conveyors and associated controls to enable achievement of accurate and high rate feeding as single articles and/or pairs of articles. The method of the present invention, which employs four servo driven flat belt conveyors, requires that the fourth flat belt conveyor be proportional in conveyor length to the length of the individual articles to be wrapped.

BRIEF DESCRIPTION OF THE DRAWINGS

FIG. 1 is a plan view of a four conveyor apparatus for automatically feeding a horizontal wrapping machine using the present invention.

FIG. 2 is an isometric view of a four conveyor light contact feeder of the present invention.

FIGS. 3A, 3B illustrate transfer modules for transferring articles between a feeder of the present invention and a horizontal wrapping or other article processing machine.

FIG. 4 is a longitudinal section of the light contact feeder illustrating arrangements of motors and conveyor belts used in transporting articles along the feeder.

FIG. 5 illustrates a block diagram of circuitry for controlling operation of the four belt light contact feeder of the present invention.

FIGS. 6–18 are flow charts which explain the operation of the four belt light contact feeder disclosed in FIGS. 1–5.

FIGS. 19 and 20 illustrate electronic control circuitry which can be used with the four belt light contact feeder of the present invention.

FIG. 21 is a side elevation of a portion of another embodiment of the light contact feeder of the present invention.

FIG. 22 is a plan view of the light contact feeder disclosed in FIG. 21.

FIG. 23 is an end view of the light contact feeder of FIG. 21.

DESCRIPTION OF THE PREFERRED EMBODIMENT

An automatic feeding and wrapping system disclosed in FIG. 1 includes an article supply conveyor S having a belt 1 which supplies randomly spaced articles 2 to a feeder module 4 which adjusts the distance between the articles so the articles 2 are evenly spaced and delivered to a wrapping machine W at a speed equal to the speed of a receiving conveyor 11. A transfer conveyor TC (FIGS. 1, 2, 3A, 3B) enables the articles 2 to be delivered via belts 3a and 3b to the receiving conveyor 11 of the wrapping machine W (FIG. 3B) which is aligned with the feeder module 4, or to a wrapper receiving conveyor 11 (FIG. 3A) which is at an oblique angle to the feeder module 4. A similar transfer conveyor (not shown) can be used to transfer articles to a wrapping conveyor at right angles to the feeder module. Several other types of transfer apparatus can be connected between the wrapper conveyor and the feeder module 4.

The feeder module 4 (FIGS. 1, 2, 4) includes a gap altering and accumulator conveyor G and a metering conveyor M to continuously adjust gaps between the articles 2 as these articles are conveyed from the supply conveyor S in response to electronic circuitry mounted in a cabinet portion 4a of the feeder module 4.

Each of the four conveyors of feeder module 4 (FIGS. 1-4) includes a flat belt 5a-5d mounted on a plurality of rollers 6 (FIG. 4) and which is accelerated by a drive roller 7 which is driven by a motor M1-M4 and a drive belt 8. Rotational position of each motor M is monitored by an associated encoder E1-E4, and motor speed is monitored by a associated tachometer T1-T4 (FIGS. 4, 5). Each of the rollers 6 and drive rollers 7 is slightly crowned with a smaller diameter portion at each end so the associated belts 5a-5d are automatically centered relative to the ends of the rollers. Because the articles 2 need to be lightly abutted on the accumulator G side guides are required to constrain the articles. This light pressure abutment minimizes damage to the delicate articles. The rollers 6 and 7 contact only the inside portions of the associated belts 5a-5d so article residue on the conveyor belts does not accumulate on the rollers. Collection tubs can be placed underneath the conveyors to collect loose particles that fall from the belts. The belts can be easily removed for clean up or for belt replacements. An individual servo drive motor for each belt provides highly responsive independent control of each conveyor module. The presence or absence of articles 2 is detected by photocells 9a-9g mounted above the conveyors S, G, A and TC (FIGS. 2, 4, 5). The photocells can be mounted in other positions such as directly across from the articles on the conveyors. Signals from the photoelectric cells 9a-9g are coupled to a control circuit 10 (FIG. 5) which controls speeds of the individual motors M1-M4 (FIGS. 4, 5) and their associated conveyor belts 5a-5d to control the spacing and timing of the articles 2.

The accumulator conveyor G is continuously velocity corrected to reposition articles 2 so the articles are lightly abutted The receiving conveyor 11 (FIGS. 3A, 3B) of wrapping machine W includes a plurality of flights or spaces F between a plurality of pushers U which ensure that articles are delivered in proper phase to the wrapping portion (not shown) of wrapping machine W. Pushers U can be eliminated by utilizing high friction conveyor belt material to maintain the product in position for proper delivery to the wrapping portion. The metering conveyor M is continuously velocity corrected to time the abutted articles relative to the flights of the receiving conveyor 11 (FIG. 1) of the horizontal wrapping machine W. This correction is such that after the individual articles are accelerated by conveyor A (FIGS. 1, 2, 3A, 3B) to a velocity matched with the wrapper receiving conveyor 11 they will be properly timed with respect to its flights. Conveyor M corrects the timing of each successive leading article of an abutted article slug as individual articles are metered off for acceleration and transfer to the wrapping machine.

In a fine phasing mode, conveyor P individual phases each passing article 2 relative to the position of a receiving conveyor 11 or any flight thereof. This is a fine tuning mode which enables feeder module 4 to accurately position individual articles at relatively high feed rates even when friction characteristics of the individual articles vary significantly. In this operating mode, conveyor P corrects for article 2 position errors on acceleration conveyor A that were due to frictional errors generated by the speed up transfer of articles 2 from metering conveyor M to accelerating conveyor A.

When the feeder is in an article pairing mode, conveyor P serves to group articles 2 into uniformly spaced pairs properly timed relative to the position of receiving conveyor 11 or any flights thereof. In article pairing, mode "A", conveyor P functions to retard the lead article of a pair until it is lightly contacted by the trailing article of the pair. In article pairing, mode "B", conveyor P functions to advance the trailing article of the pair until it lightly contacts the lead article of the pair.

In any of the above operating modes, it is necessary that the length of conveyor P be proportional to the length of the individual article 2. In the fine phasing mode, the position of an individual article 2 is corrected only while this article is fully on conveyor P. Transfers on and off conveyor P are at a matched velocity. In article pairing mode "A", the lead article of a pair is retarded once that article is more than a half onto conveyor P. In article pairing mode "B" the trail article of a pair is advanced once the lead article is more than half off the conveyor P.

The feeder control circuit 10 (FIG. 5) includes a circuit module 12 for controlling operation of; the gap altering and accumulator belt 5a, the metering belt 5b, the acceleration belt 5c, and the phase altering belt 5d (FIGS. 1, 2, 4). The circuit module 12 includes a master programmable logic controller or computer 13 for controlling operation of motors M1, M2, M3, M4 in response to signals from the wrapping machine W and from the photoelectric cells 9a-9g. One such master controller which can be used in the present invention is the Model ZT-8815 which is manufactured by Ziatech Corporation, San Luis Obispo, Calif. The master controller 13 provides control signals to and receives signals from four separate axis motion controllers 14a, 14b, 14c, 14d which in turn receive rotational speed and positional signals from associated shaft encoders E1-E4. Motion controllers 14a, 14b, 14c, 14d each provide control signals to associated servo motor controllers 15 which supply power for driving the corresponding servo motors M. One motion controller 14 which can be used in the present invention is the STD-16.03 which is manufactured by Amtek Digital Systems, Inc., Seattle, Wash. One servo motor controller 15 which can be used in the present invention is the pulse width modulated (PWM) type, Model GA4567P available from Glentek, El Segundo, Calif. A shaft encoder E which can be used in the present invention is the Model H25 manufactured by BEI Motion Systems Company of Golf, Calif.

Lead 16a communicates the machine's status signal to logic controller 13 which also receives the lead 16b wrapper velocity and position reference signals from a master encoder E5 on a wrapping machine W. Logic controller 13 continuously processes these input signals and continuously sends output control signals to the motion controllers of the M and A conveyors and thereby synchronizes these conveyors with the operation of the wrapping machine W. Logic controller 13 also continuously processes status input signals from all photocells 9a-9g and continuously sends an output signal over lead 17a to automatically control a motor 18 to control the rate of wrapping machine W and thereby to automatically maintain the backlog of abutted articles 2 within preset limits. Lead 17b transmits a signal from logic controller 13 to a device for ejecting occasionally out-of-phase articles which might occur under transient conditions such as emergency stops, rapid starts, etc. A blast of air from a nozzle 19 (FIG. 2) is used to eject out-of-phase articles from transfer conveyor TC. Lead 17c provides start/stop commands to the wrapper W.

The signal from the encoder E5 (FIG. 5) on the wrapping machine W insures proper timing operation of the feeder module 4 relative to operation of the wrapping machine, and signals from the encoders E provide accurate measurements of respective movements of each of the four conveyor belts 5. Leads 20, 21 from the encoders E and tachometers T provide closed loop operation of motion computers 14 and servo motor controllers 15 to control conveyor belt accelerations and insure maximum performance without slippage problems. The encoders E provide up to 1000 counts per revolution so they provide very accurate timing which is especially good for low wrapping rates on the feeder.

The control system (FIG. 5) of the present invention may be programmed to provide for feeding "groups" of articles into a flighted or unflighted receiving conveyor of a wrapping or other article processing machine. Paired articles "groups" for example would be obtained by programming the logic controller 13 to control a conveyor P velocity so multiple articles are transferred to the transfer module conveyor T per wrapping machine cycle. In this grouping application, the logic controller 13 would be programmed to meter and phase the paired article "groups" for properly timed transfer into the flighted or unflighted receiving conveyor of the wrapping machine P.

Preset programs can be loaded into the computer 13 and selected either by a selector switch or by a communication link with a remote computer such as a personal computer so a human operator can easily select proper speed, package size and groupings. Since the feeder and wrapping machines are linked together the machines are appropriately synchronized. Since the wrapping machine supplies a timing signal from encoder E5 to the feeder module 4 no registration marks are required on any conveyors or on the wrappers to synchronize the two machines. The leading or trailing edges of articles 2 are sensed and timing circuit can be used to determine whether the individual conveyor belt should be speeded up or slowed down.

The feeder uses computer 13 (FIG. 5) to control the motion controllers 14 and the motor controllers 15 so that the velocity of the articles being transferred from the gap altering and accumulator conveyor G to the metering conveyor M matches or slightly exceeds the speed of the metering conveyor to which they are transferred. This minimizes article damage by limiting accumulation contact pressure.

The feeder module 4 follows the wrapping machine W. The feeder module also commands the wrapping machine to follow, within preset limits, the rate of supply of incoming articles to on the supply conveyor belt 1. If the article supply rate increases, the feeder and wrapper rates also increase, and if the article supply rate decreases, the feeder and wrapper rates also decrease.

The feeder module 4 (FIGS. 2, 4) sends a rate control signal to the wrapping machine W to command it to operate at the same rate as the article supply. If the articles 2 seen by photocell 9a (FIGS. 2, 4) on the feeder module 4 are detected as being abutted together above a maximum backlog level the feeder module will increase the rate signal to the wrapping machine W by a preset amount until the spacing between the articles adjacent photocell 9a are no longer abutted. If the article adjacent photocell 9c on the feeder module 4 are detected as being spaced apart the feeder module will decrease the speed control signal to the wrapping machine W by a preset amount until the articles are abutted to a minimum backlog level.

The gap altering and accumulator conveyor G has two modes of operation:

(a) Following Mode.

During this mode of operation the accumulator conveyor belt 5a follows the velocity of the metering belt 5b. No corrections are made to the articles on the accumulator belt in this mode. The computer commands the following mode whenever photocells 9b and 9c detect abutted articles.

(b) Gap Closing Mode.

The computer commands this mode whenever a gap has been detected between articles by the associated article detection photocells 9b or 9c. The accumulator conveyor belt 5a is then commanded to operate at a computer selected forward correction mode speed. The forward correction mode speed may optionally be determined by a computer algorithm. The algorithm determines the maximum speed to which the speeds can be accelerated from base feed speed (based upon packaging rate) at a preset acceleration during a movement of one-half the article length.

The accumulator conveyor will continue to operate at correction speed until the associated article detection photocell sees abutted articles. The conveyor belt 5a will then decelerate to match the velocity or velocity ratio of the adjacent downstream metering conveyor belt 5b and enter the "following mode".

The feeder monitors an encoder or some other type of position/velocity transducer E5 mounted on the packaging machine. The transducer information is used in conjunction with article position detector 9d associated with the metering conveyor M to determine the position error between the sensed actual article position and a preset desired article position. A metering conveyor drive correction signal proportional to the determined error is implemented. This is accomplished by changing the velocity of the metering conveyor belt 5b for a computer calculated machine or real time period. This action corrects the article position and the resulting new position error becomes less than a preset value.

The present invention includes an automatic start-up mode which would be used only if the associated wrapping machine has an automatic start-up mode. When the wrapping machine is placed "on-line" in the automatic start mode the feeder is automatically armed. If articles are sitting on the feeder, as retained in the memory of computer 13, the feeder sends a start signal to the wrapping machine and triggers the following operation:

I. The wrapping machine will start an alarm and after a suitable time delay start operating at a speed as commanded by the feeder.

II. The feeder will monitor the velocity/position sensor such as encoder E5 on the wrapping machine and follow this machine as the speed increases.

III. The article supply on the supply conveyor 1 will be monitored via the associated article detection photocell 9g. This information is used to set the running base velocity of the feeder and the wrapping machine.

If articles are not sitting on the feeder as retained in the computer memory, the feeder will operate as follows:

I. The feeder belts will be commanded to operate at a preset start up rate.

II. The supply conveyor product detection photocell 9g will monitor the incoming supply rate to determine when a usable supply of articles is available at a fairly constant rate. Articles not falling into this category will be rejected off the transfer conveyor.

III. When a "usable" supply of articles has been detected, the feeder will command the wrapping machine to start at such a real time that the feeder will put an article into the first desired flight of the receiving conveyor of the wrapping machine, thereby preventing the creation of an empty package.

IV. The article supply rate from the supply conveyor 1 will be monitored via the associated product detection photocell 9g. This information is used to set the running base velocity of the feeder and the wrapping machine.

If the article supply rate disappears or otherwise becomes too sporadic for use, this will cause the feeder to do the following:

I. The wrapping machine will be commanded to decelerate and stop.

II. The feeder will revert back to the "on-line" in the automatic start mode. During this automatic start and stop, any articles out of phase will be automatically ejected off the transfer conveyor TC by air nozzle 19.

Programs for operating the wrapping machine and the feeder can be stored in the computer 13 and the desired program selected by a remote control over a communications link or the programs could be selected by an optional selector switch on the feeder control cabinet 4a. The program data would include such parameters as product length.

The feeder has the capability of semi-automatically adjusting all article specific operational settings except the physical position of the product detection photocells 9. The setup procedure is as follows:

a. Set the setup mode selector switch to the "setup" position.

b. Place the wrapping machine W in the "auto start" mode.

c. The feeder module 4 will now command the wrapping machine W to start and run at a preselected speed. The wrapping machine will sound an alarm and will then start.

d. The feeder module 4 will monitor the velocity/position transducer E5 mounted on a wrapping machine W. Computer 13 will determine the velocity and the acceleration rate of the wrapping machine W. The velocity is used to identify the setting of the base velocity ratios for the metering belt M and the gap altering and accumulator belt G. The acceleration measure is used to match start up and shut down parameters between the feeder and the wrapping machine.

e. The wrapping machine is commanded to stop.

f. The feeder commands all feeder belts to operate at 5" per second.

g. One article is manually placed on the accumulator belt. The article travels on each conveyor past the associated product detection photocells 9. The photocells are used to measure the length of the article.

h. The conveyors stop after all photocells 9 have sensed passage of the article.

i. The length of the article measured is used to configure the following base velocity ratio and the gap and error sensing algorithm automatically for the new article. The length measured is also used to automatically limit the maximum range of the packing machine speed control command generated by the computer 18 of feeder module 4. The longer the article, the lower the allowable packing machine speed range.

j. Set the mode selector switch to the "operate" position.

k. Stop the associated wrapping machine.

The flow charts of FIGS. 6-18 illustrate in more detail the sequence of the basic operation of feeder module 4 described above and can be used in programming the feeder computer 13. An overview of the program for operating the feeder control module 4 and wrapping machine W is disclosed in FIG. 6. FIGS. 7-18 each disclose detailed operation of a corresponding one of the blocks of FIG. 6. For example, the basic executive program which includes loading the program into the processor and checking the zero position of the encoder is disclosed in FIG. 7. The steps for automatic setup of the feeder are disclosed in FIG. 8.

FIGS. 6-18 illustrate in detail the sequence of operation of a basic two belt feeder and associated wrapper speed control. One skilled in the art can use the information disclosed in FIGS. 6-18 as a guide for programming very similar operating sequences to control the acceleration conveyor A and the phasing conveyor B to achieve their respective functions as verbally described herein.

Details of control circuit 10 (FIG. 5) are disclosed in FIGS. 19 and 20. The programmable logic controller 13 includes a master computer 13a and a plurality of input, output and display devices 48-53. A relay output card 48 which can be used in the present invention is the Model 7502 manufactured by Prolog Corporation, Monterey, Calif. An input card 49 which can be used is Model ADI-7911 made by Matrix Corporation, Raleigh, N.C. An analog output card 51 (FIG. 20) is Model STD-139 made by Micro Link, Carmel, Ind. A serial interface card 52 which can be used is Model ZT-8840 made by Ziatech Corporation, San Luis Obispo, Calif. A keyboard and display device 53 which can be used is Model Transterm 5 made by Computerwise Inc., Olathe, Kans.

FIGS. 19 and 20 illustrate details of the control circuit for a basic two belt feeder operation and associated wrapper speed control. One skilled in the art can use the information disclosed in FIGS. 19 and 20 as a guide for developing circuitry to control the velocity of the acceleration conveyor A and the phasing conveyor B to achieve their respective functions as verbally described herein.

The present invention is able to feed noncohesive articles, irregularly spaced articles, delicate articles, articles which tend to shingle and articles which tend to interleave, all of which have been difficult to feed to wrapping and other types of article processing machines. The description up to this point discloses a preferred embodiment of the present invention which employs four servo driven flat belt conveyors to achieve accurate and a high speed feeding of articles or article groupings into the receiving conveyor of an article wrapping or processing machine. An alternative embodiment could employ a drive shaft and/or drive belt linkage between the acceleration conveyor A and the article wrapping or processing machine W. This would reduce the servo drive axis requirement from four to three. The article feeding and/or grouping performance of this alternative embodiment would be equivalent in all respects to that of the preferred embodiment shown.

Another embodiment of the light contact feeder of the present invention disclosed in FIGS. 21-23 includes an air/belt accumulator assembly G' which replaces the accumulator conveyor G of FIGS. 1, 2, 4. A pair of spaced belts 5a' mounted on a plurality of rollers 6 are driven by a drive roller 7 powered by a motor (not shown) in the manner shown in FIG. 4. A motor 25 powers a blower 26 (FIG. 21) which supplies air under low pressure to a manifold 27 via a duct 28. A plurality of holes 31 along the top portion of manifold 27 provide air which partially supports articles 2 as they are moved along assembly G'. A pair of guides 32 keep articles 2 centered relative to belts 5a' and a hold-down bar 33 limits upward movement of articles 2. Guides 32 are mounted in a plurality of vertical members 34 which support a pair of horizontal support members 35. Hold-down bar 33 is connected to support members 35 by a pair of support rods 36. The vertical position of support rods 36 (FIG. 23) can be adjusted by means of a pair of set screws 40 (only one being shown). The presence or absence of articles 2 along assembly G' is detected by photocells 9a-9c. The upward air pressure on articles 2 reduces the friction between articles 2 and belts 5a' and reduces accumulation pressure between adjacent articles to reduce the damage to fragile articles. As a result a relatively long backlog of abutted articles can accumulate on assembly G' with relatively light contact pressure between articles. The number of backlogged abutted articles can be further increased by making assembly G' (FIGS. 21-23) considerably longer than accumulator conveyor G of FIG. 4.

The present invention discloses a feeder which can take delicate articles, place the articles in a lightly abutted arrangement, accelerate the articles to a speed and a phase to match individual flights of a flighted conveyor, and deliver the articles either singly or in pairs to the flighted conveyor or to appropriate positions on unflighted receiving conveyors.

Although the best mode contemplated for carrying out the present invention has been herein shown and described, it will be apparent that modification and variation may be made without departing from what is regarded to be the subject matter of the invention.

What is claimed is:

1. A light contact feeder for receiving randomly spaced articles from a supply conveyor, lightly abutting the articles and delivering a single article or a plurality of articles to a flighted conveyor at a speed and at a spacing to match flights on the flighted conveyor, said feeder comprising:

first, second, third and fourth feeder conveyors;

means for mounting said first feeder conveyor between a supply conveyor and said second feeder conveyor;

at least one article sensor operable to sense articles on said first conveyor and to develop a signal indicative of whether articles on said first feeder conveyor are in abutted relationship;

means responsive to said signal for increasing the speed of said first feeder conveyor above the speed of said second feeder conveyor when abutted articles are not detected on said first feeder conveyor to thereby cause articles on said first feeder conveyor to accumulate in abutting relationship, and for decreasing the speed of said first feeder conveyor to match the speed of said second feeder conveyor when abutted articles are detected on said first feeder conveyor to thereby minimize slippage of said first feeder conveyor relative to said articles thereon accumulated on said first feeder conveyor;

means for mounting said third feeder conveyor between said second feeder conveyor and said fourth feeder conveyor;

means for continuously controlling the velocity of said second feeder conveyor to time said articles relative to a plurality of flights on a flighted conveyor, said timed articles being delivered to said third feeder conveyor;

means for continuously controlling the velocity of said third feeder conveyor to accelerate said articles to match the speed of said flighted conveyor, said matched articles being delivered to said fourth feeder conveyor;

an article sensing means mounted adjacent to said fourth feeder for sensing said articles and developing an article signal when an article is detected; and means for using said article signals to continuously control the velocity of said fourth feeder conveyor to phase the individual articles to match the flights on said flighted conveyor.

2. A light contact feeder as defined in claim 1 including means for continuously controlling the velocity of said fourth feeder conveyor to place a pair of individual articles into each of said flights on said flighted conveyor.

3. A light contact feeder as defined in claim 1 including means for continuously controlling the velocity of said fourth feeder conveyor to place more than two individual articles into each of said flights on said flighted conveyor.

4. A light contact feeder as defined in claim 1 including means for continuously controlling said fourth feeder conveyor to adjust the position of single articles delivered at high speeds and to compensate for frictional characteristics of said articles.

5. A light contact feeder as defined in claim 1 including a logic controller for receiving wrapper velocity and position reference signals from said flighted conveyor, said logic controller having means for processing said velocity and position reference signals and for developing signals to control the velocity of said second and said third feeder conveyors relative to the velocity and position of flights of said flighted conveyor.

6. A light contact feeder as defined in claim 1 including first, second, third, fourth and fifth signal encoders each having means for providing a signal representative of a rotational position and a rotational speed of said encoder, means for coupling said fifth encoder to said flighted conveyor, means for coupling each of said first, second, third and fourth encoders to a corresponding one of said first, second, third and fourth feeder conveyors, and means for using signals from each of said encoders to provide accurate measurements of respective movements of each of said first, second, third and fourth feeder conveyors and to provide proper timing operation of said first, second, third and fourth feeder conveyors relative to said flighted conveyor.

7. A light contact feeder as defined in claim 6 including a plurality of servo motor controllers, means for connecting each of said motor controllers to a corresponding one of said first, second, third and fourth encoders, a plurality of motors, means for connecting each of said motors between a corresponding one of said feeder conveyors to provide closed loop operation of each of said feeder conveyors.

8. A light contact feeder for receiving randomly spaced articles from a supply conveyor, lightly abutting the articles and delivering a single article or a plurality of articles to a flighted conveyor at a speed and at a spacing to match flights on the flighted conveyor, said feeder comprising:

first, second, third and fourth feeder conveyors;

means for mounting said first feeder conveyor between a supply conveyor and said second feeder conveyor;

first, second, third, fourth and fifth photocells;

means for mounting each of said first, said second and said third photocells adjacent to said first feeder coneyor where each of said first, second and third photocells develops a signal when an article is detected;

means for continuously using said signals from said first, said second and said third photocells to increase the speed of said first feeder conveyor above the speed of said second feeder conveyor when said first, second and third photocells do not detect the presence of abutted articles beyond a predetermined point on said first feeder conveyor, and to decrease the speed of said first feeder conveyor to match the speed of said second feeder conveyor when said first, second and third photocells detect the presence of abutted articles beyond said predetermined point on said first feeder conveyor to arrange thereby a plurality of articles received from said supply conveyor into a lightly-abutted relationship for delivery to said second feeder conveyor;

means for mounting said third feeder conveyor between said second feeder conveyor and said fourth feeder conveyor;

means for continuously controlling the velocity of said second feeder conveyor to time said articles relative to a plurality of fights on a flighted conveyor, said timed articles being delivered to said third feeder conveyor;

means for continuously controlling the velocity of said third feeder conveyor to accelerate said articles to match the speed of said flighted conveyor, said matched articles being delivered to said fourth feeder conveyor;

means for mounting said fourth and said fifth photocells adjacent to said fourth feeder conveyor where said fourth and said fifth photocells each develop a signal when an article is detected; and means for using said signals from said foruth and said fifth photocells to continuously control the velocity of said fourth feeder conveyor to phase the individual articles to match the flights on said flighted conveyor.

9. A light contact feeder as defined in claim 8 wherein a length of said fourth feeder conveyor is proportional to a length of an article to be delivered to said flighted conveyor.

10. A light contact feeder as defined in claim 8 including means for using said signals from said fourth and said fifth photocells to continuously control the velocity of said foruth feeder conveyor to place a pair of individual articles into each of said flights on said flighted conveyor.

11. A light contact feeder as defined in claim 8 including means for using said signals from said fourth and said fifth photocells to continuously control the velocity of said fourth feeder conveyor to place more than two individual articles into each of said flights on said flighted conveyor.

12. A light contact feeder as defined in claim 8 including means for using said signals from said fourth and said fifth photocells to continuously control said fourth feeder conveyor to adjust the position of single articles delivered at high speeds and to compensate for frictional characteristics of said articles.

13. A light contact feeder as defined in claim 8 including a logic controller for receiving wrapper velocity and position reference signals from said flighted conveyor, said logic controller having means for processing said velocity and position reference signals and for developing signals to control the velocity of said second and said third feeder conveyors relative to the velocity and position of flight of said flighted conveyor.

14. A light contact feeder as defined in claim 8 including first, second, third, fourth and fifth signal encoders each having means for providing a signal representative of a rotational position and a rotational speed of said encoder, means for coupling said fifth encoder to said flighted conveyor, means for coupling each of said first, second, third and fourth encoders to a corresponding one of said first, second, third and fourth feeder conveyors, and means for using signals from each of said encoders to provide accurate measurements of respective movements of each of aid first, second, third and fourth feeder conveyors and to provide proper timing operation of said first, second, third and fourth feeder conveyors relative to said flighted conveyor.

15. A light contact feeder as defined in claim 8 including a plurality of servo motor controllers, means for connecting each of said motor controllers to a corresponding one of first, second, third and fourth encoders, a plurality of motors, means for connecting each of said motors between a corresponding one of said feeder conveyors to provide closed loop operation of each of said feeder conveyors.

* * * * *